(12) United States Patent  (10) Patent No.: US 8,259,029 B2
Abdelgany et al.  (45) Date of Patent: Sep. 4, 2012

(54) IMPLEMENTATION OF DIVERSITY ANTENNAS IN SMALL PORTABLE MEDIA DEVICES AND CELL PHONES

(75) Inventors: MohyEldeen F. Abdelgany, Irvine, CA (US); Jun Ma, Xian (CN); James F. Kamke, San Diego, CA (US)

(73) Assignee: Newport Media, Inc., Lake Forest, CA (US)

( * ) Notice: Subject to any disclaimer, the term of this patent is extended or adjusted under 35 U.S.C. 154(b) by 1008 days.

(21) Appl. No.: 12/099,881

(22) Filed: Apr. 9, 2008

(65) Prior Publication Data

US 2009/0257607 A1  Oct. 15, 2009

(51) Int. Cl.
*H01Q 3/24* (2006.01)
(52) U.S. Cl. ......... 343/876; 343/718; 343/893; 343/904
(58) Field of Classification Search ................... 343/718, 343/893, 904, 876
See application file for complete search history.

(56) References Cited

U.S. PATENT DOCUMENTS

| | | | | |
|---|---|---|---|---|
| 4,369,521 | A * | 1/1983 | Sawada | 455/270 |
| 7,864,133 | B2 * | 1/2011 | Rofougaran | 343/861 |
| 7,899,110 | B1 * | 3/2011 | Zhang et al. | 375/150 |
| 2005/0181844 | A1 * | 8/2005 | Edeler et al. | 455/575.2 |
| 2005/0245234 | A1 * | 11/2005 | Stopek | 455/411 |
| 2006/0094349 | A1 * | 5/2006 | Slesak et al. | 455/3.02 |
| 2006/0099993 | A1 * | 5/2006 | Leinonen et al. | 455/562.1 |
| 2006/0166719 | A1 * | 7/2006 | Arad et al. | 455/575.2 |
| 2007/0171134 | A1 * | 7/2007 | Yoshino et al. | 343/702 |
| 2008/0057889 | A1 * | 3/2008 | Jan | 455/185.1 |
| 2008/0076478 | A1 * | 3/2008 | Russell et al. | 455/562.1 |
| 2008/0170739 | A1 * | 7/2008 | Suematsu et al. | 381/380 |
| 2008/0198082 | A1 * | 8/2008 | Soler Castany et al. | 343/770 |
| 2008/0198090 | A1 * | 8/2008 | Yamaguchi et al. | 343/859 |
| 2008/0204338 | A1 * | 8/2008 | Rofougaran | 343/751 |
| 2008/0273735 | A1 * | 11/2008 | Burson et al. | 381/363 |
| 2009/0096685 | A1 * | 4/2009 | Harano | 343/702 |
| 2009/0257607 | A1 * | 10/2009 | Abdelgany et al. | 381/311 |
| 2010/0070385 | A1 * | 3/2010 | Wassingbo et al. | 705/27 |
| 2010/0107260 | A1 * | 4/2010 | Orrell et al. | 726/27 |
| 2010/0141538 | A1 * | 6/2010 | Yoshino et al. | 343/702 |
| 2010/0159840 | A1 * | 6/2010 | Rosener et al. | 455/67.11 |
| 2010/0176993 | A1 * | 7/2010 | Pedersen | 343/702 |
| 2010/0279734 | A1 * | 11/2010 | Karkinen et al. | 455/554.2 |
| 2010/0297959 | A1 * | 11/2010 | Newton et al. | 455/83 |
| 2011/0002496 | A1 * | 1/2011 | Meesters | 381/370 |
| 2011/0102291 | A1 * | 5/2011 | Rofougaran | 343/861 |

* cited by examiner

*Primary Examiner* — David S. Warren
(74) *Attorney, Agent, or Firm* — Rahman LLC

(57) ABSTRACT

A mobile telecommunications apparatus includes a portable media device adapted to receive electronic data through a network, the portable media device comprising a first antenna adapted to receive electromagnetic signals of a particular frequency, the frequency is at least one of a radio frequency and a television (TV) frequency, and a headset in electrical communication with the portable media device and adapted to receive the electronic data through the network, the headset includes a switch coupled to the first antenna, a second antenna coupled to the switch, and a headset speaker comprising at least one of a mono headset speaker and a stereo headset speaker, the switch is adapted to combine operation of the first antenna and the second antenna into a dual operation diversity receiver. The network may comprise a Digital Video Broadcasting over Handheld (DVB-H) network.

20 Claims, 13 Drawing Sheets

SIGNAL COMBINATION DIVERSITY (MRC MODE)

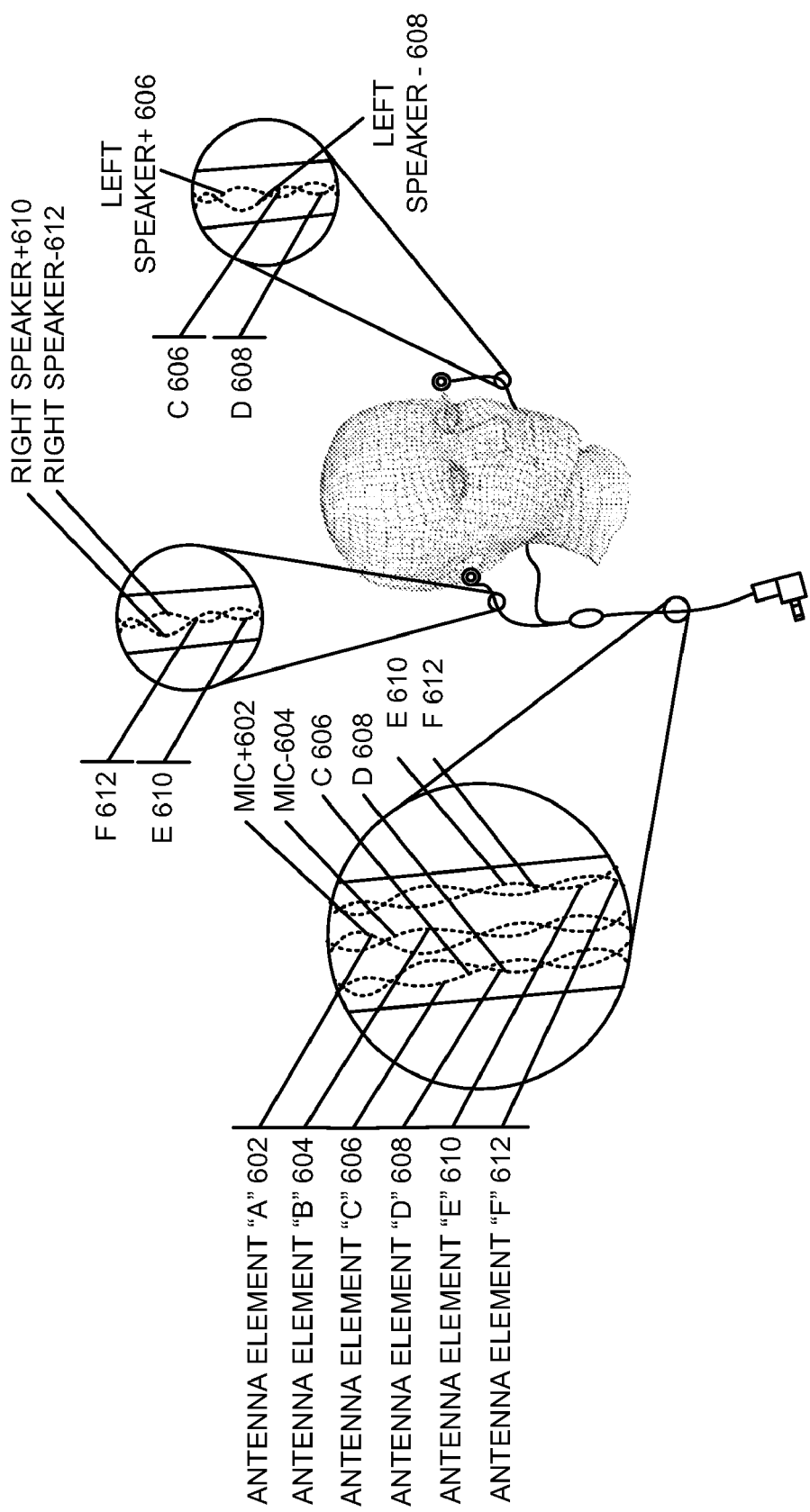

HEADSET SPEAKER

HEADSET SPEAKER
EQUIVALENT CIRCUIT

HEADSET SPEAKER &
EQUIVALENT CIRCUIT
FREQUENCY RESPONSE

HEADSET SPEAKER
WITH CAPACITOR TERMINATION

HEADSET SPEAKER WITH IDEAL
CAPACITOR EQUIVALENT CIRCUIT

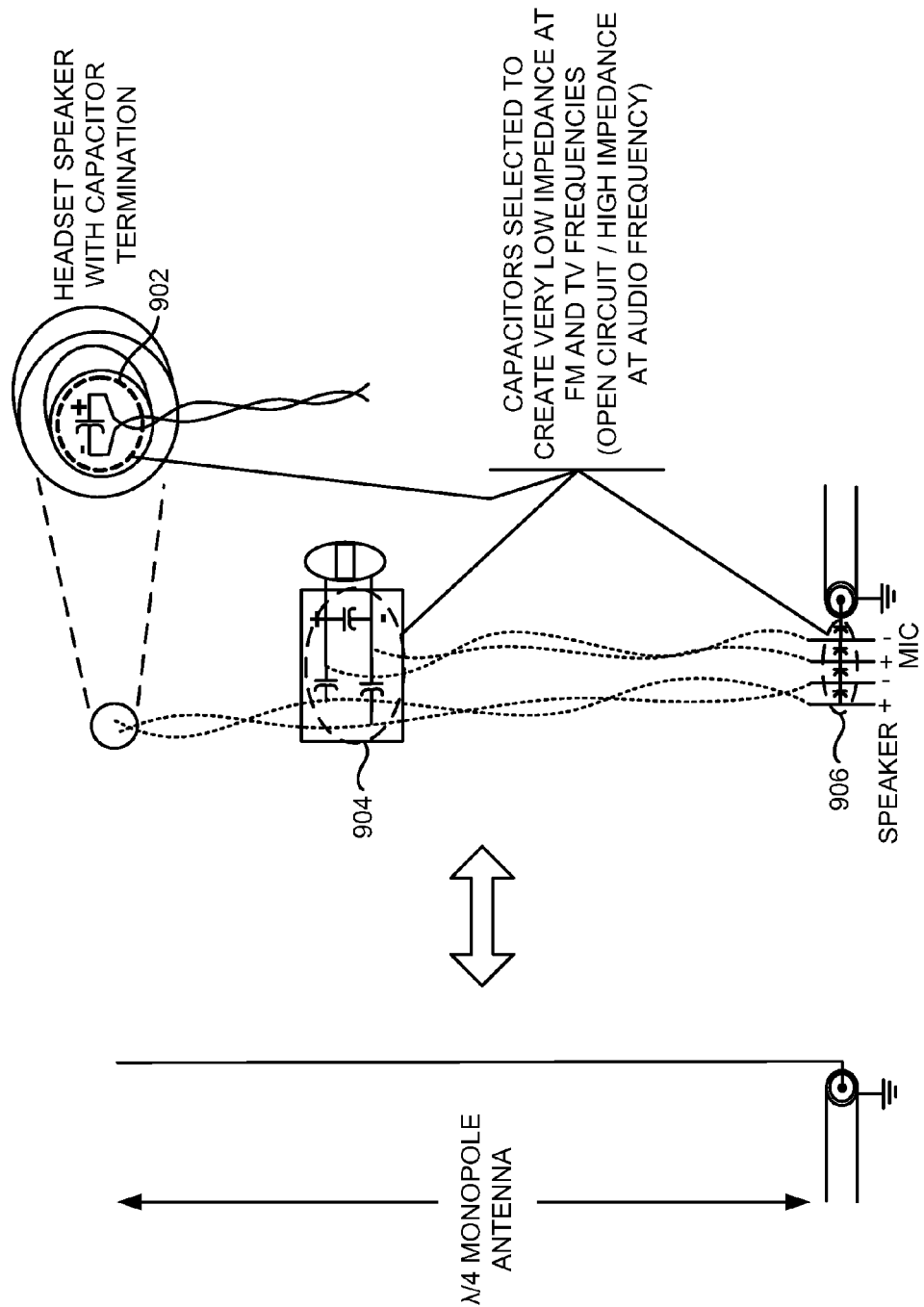

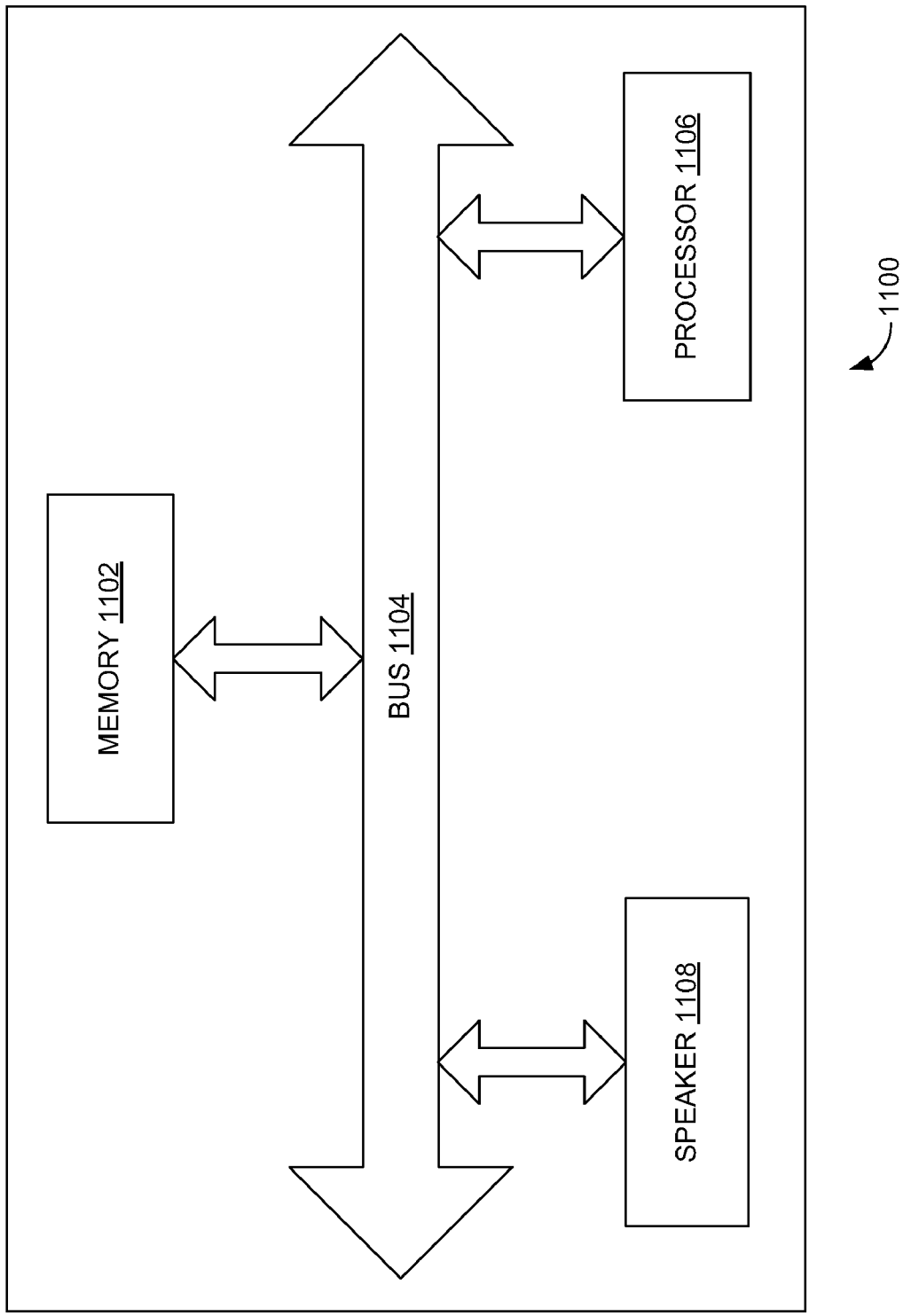

IMPLEMENTATION OF DIVERSITY ANTENNAS IN SMALL PORTABLE MEDIA DEVICES AND CELL PHONES

BACKGROUND

1. Technical Field

The embodiments herein generally relate to Digital Video Broadcasting over Handheld (DVB-H) systems, and, more particularly, to implementation of diversity antennas in small portable media devices such as cell phones.

2. Description of the Related Art

DVB-H is a technical specification for bringing broadcast services to handheld receivers, terrestrial television (TV), portable TVs, mobile phones and other such mobile terminals. In DVB-H device systems, diversity receivers are used to improve the carrier-to-noise (C/N) performance and to provide diversity gain (e.g., by about 3 to 9 dB) in static to slow varying channel conditions and/or Doppler frequency (e.g., by twice) in mobile channel condition. In addition, they suppress part of the ingress noise and short echoes problems, thus offering significant reception performance improvement with portable and mobile reception in places where a single receiver would not function.

SUMMARY

In view of the foregoing, an embodiment provides a mobile telecommunications apparatus which includes a portable media device adapted to receive electronic data through a network, the portable media device comprising a first antenna adapted to receive electromagnetic signals of a particular frequency, the frequency is at least one of a radio frequency and a television (TV) frequency, and a headset in electrical communication with the portable media device and adapted to receive the electronic data through the network, the headset includes a switch coupled to the first antenna, a second antenna coupled to the switch, and a headset speaker comprising at least one of a mono headset speaker and a stereo headset speaker, the switch is adapted to combine operation of the first antenna and the second antenna into a dual operation diversity receiver.

The network may comprise a Digital Video Broadcasting over Handheld (DVB-H) network. The mono headset speaker of the headset may include one headset speaker. The mono headset speaker of the headset may include a first antenna element corresponding to a microphone (+), a second antenna element corresponding to a microphone (−), a third antenna element corresponding to a speaker (+) and a fourth antenna element corresponding to a speaker (−). The stereo headset speaker of the headset may include a plurality of speakers.

The stereo headset speaker of the headset may include a first antenna element corresponding to a microphone (+), a second antenna element corresponding to a microphone (−), a third antenna element corresponding to a left speaker (+), a fourth antenna element corresponding to a left speaker (−), a fifth antenna element corresponding to a right speaker (+), and a sixth antenna element corresponding to a right speaker (−).

The first antenna element and the second antenna element of the mono headset speaker and the stereo headset speaker of the headset may be coupled to an ideal capacitor to reduce a high impedance by creating an effective short circuit based on at least one of the radio frequency or the TV frequency without affecting an operation of the headset speaker. The first antenna of the portable media device may be perpendicular to the second antenna of the headset. The first antenna of the portable media device may be configured into a geometric shape of the portable media device.

In another embodiment, an antenna diversity system includes a first antenna adapted to transmit and receive electronic data through a network, the first antenna is positioned in a portable media device, and a second antenna adapted to receive audio signals through the network, the second antenna is positioned in a headset operatively connected to the portable media device, the headset comprises a headset speaker comprising a plurality of antenna elements, the plurality of antenna elements are combined by an ideal capacitor, and a switch coupled to the first antenna and to the second antenna, the switch is adapted to combine operation of the first antenna and the second antenna into a dual operation diversity receiver.

The headset speaker may be at least one of a mono headset speaker and a stereo headset speaker. The mono headset speaker of the headset may comprise one headset speaker. The stereo headset speaker of the headset may comprise a plurality of speakers. The first antenna may be adapted to receive electromagnetic signals of a particular frequency, the frequency may comprise at least one of a radio frequency and a television (TV) frequency, and the ideal capacitor may be adapted to reduce a high impedance by creating an effective short circuit based on at least one of the radio frequency and the TV frequency without affecting an operation of the headset speaker.

The first antenna of the portable media device may be positioned perpendicular to the second antenna of the headset. The first antenna of the portable media device may be configured into a geometric shape of the portable media device. In yet another embodiment, a portable Digital Video Broadcasting over Handheld (DVB-H) receiver system includes a portable media device component, a first antenna positioned in the portable media device component and adapted to transmit and receive electronic data through a network, a headset operatively connected to the portable media device component, a second antenna coupled to the headset, and a switch adapted to combine operation of the first antenna and the second antenna into a dual operation diversity receiver.

The headset may further include a plurality of antenna elements, the plurality of antenna elements are coupled to an ideal capacitor to reduce a high impedance in the portable media device by creating an effective short circuit based on at least one of a radio frequency and a television (TV) frequency without affecting an operation of the headset speaker. The first antenna of the portable media device may be operationally perpendicular to the second antenna of the headset. The first antenna of the portable media device may be configured into a geometric shape of the portable media device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 illustrates a stereo headset in a mobile TV having an antenna element 'A', an antenna element 'B', an antenna element 'C' an antenna element 'D', an antenna element 'E', and an antenna element 'F';

FIG. 9A illustrates a λ/4 monopole antenna having a single radiating element;

FIG. 9B is an exploded view of the headset speaker terminated with an ideal capacitor;

FIG. 11 illustrates an exploded view of a mobile TV receiver according to an embodiment herein.

DETAILED DESCRIPTION OF PREFERRED EMBODIMENTS

Figure 1:
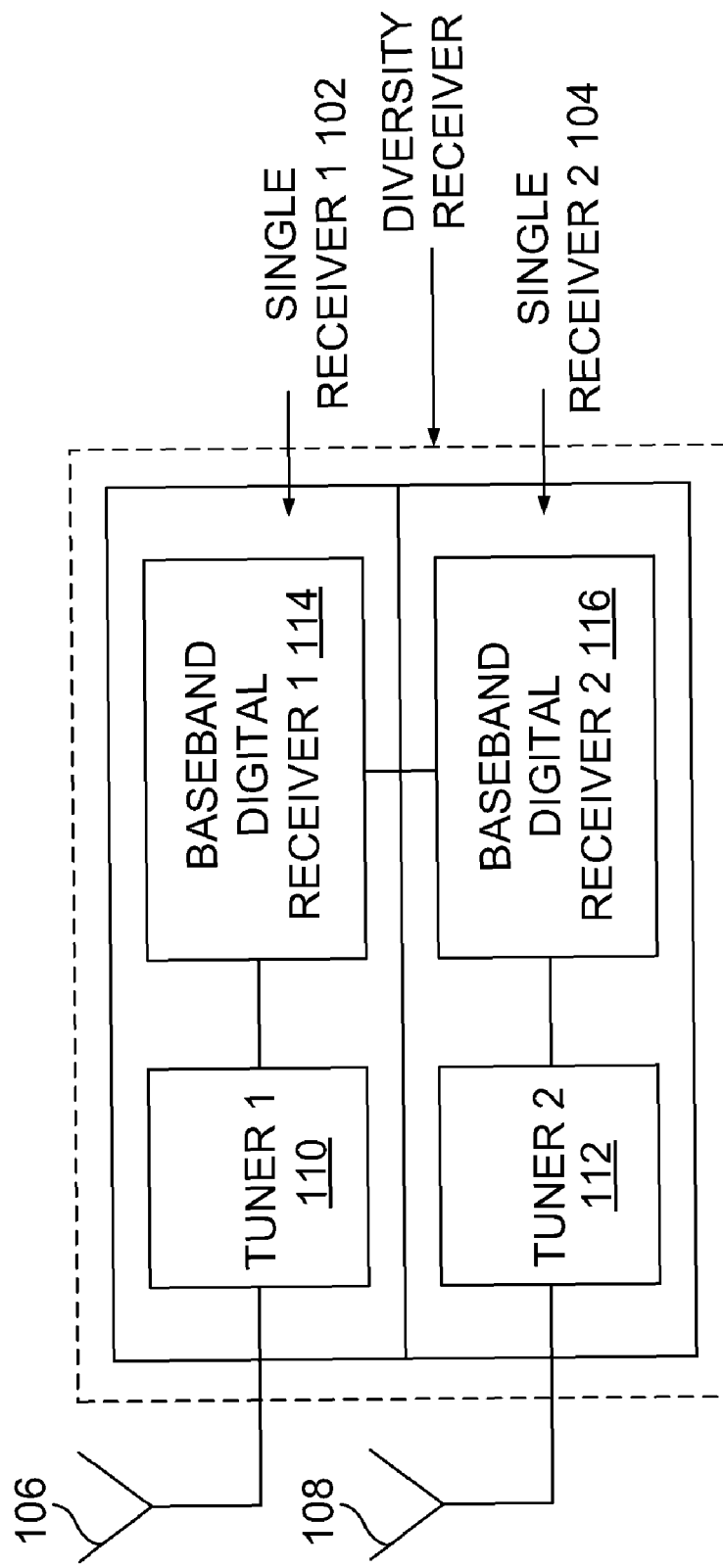
FIG. 1 illustrates a DVB-H diversity receiver having two identical single receivers with corresponding antennas.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique of implementing diversity antennas implemented in electronic devices which may occupy lesser space, hence making the size of the devices more portable and compact. The embodiments provide for the implementation of two diversity antennas in small portable media devices and/or cell phones. Due to the small feature size of the devices, two diversity antenna implementation are provided. One antenna is implemented in the portable media player or the handset and the other antenna is implemented in the headset. The two antennas may be implemented perpendicular to one another, and may be configured into the geometric shape of the cell phone or portable media devices. Referring now to the drawings, and more particularly to FIGS. 1 through 11, where similar reference characters denote corresponding features consistently throughout the figures, there are shown preferred embodiments.

Antenna diversity is a transmission technique in which the information-carrying signal is transmitted along different propagation paths. This can be achieved by using multiple receiver antennas (e.g., diversity reception) and/or by using multiple transmitting antennas (e.g., transmit diversity). A diversity combining circuit combines or selects the signals from the receiver antennas to constitute an improved quality signal. Diversity is a method used to improve to receive sensitivity of wireless devices. Various methods of antenna selection diversity such as Time-Division Multiplexing (TDM), CW, and Maximum Ration Combining (MRC) may be used.

FIG. 1 illustrates a DVB-H diversity receiver 100 having two identical single receivers 102 and 104, with corresponding antennas 106, 108. The single receivers 102 and 104 each include tuners 110, 112, and baseband digital receivers 114, 116, as shown in FIG. 1. A combining block may maximize the SNR after the combination. The power consumption of the diversity receiver 100 with two antennas 106, 108 will thus be approximately twice the power consumption of the corresponding single receiver.

Figure 2:
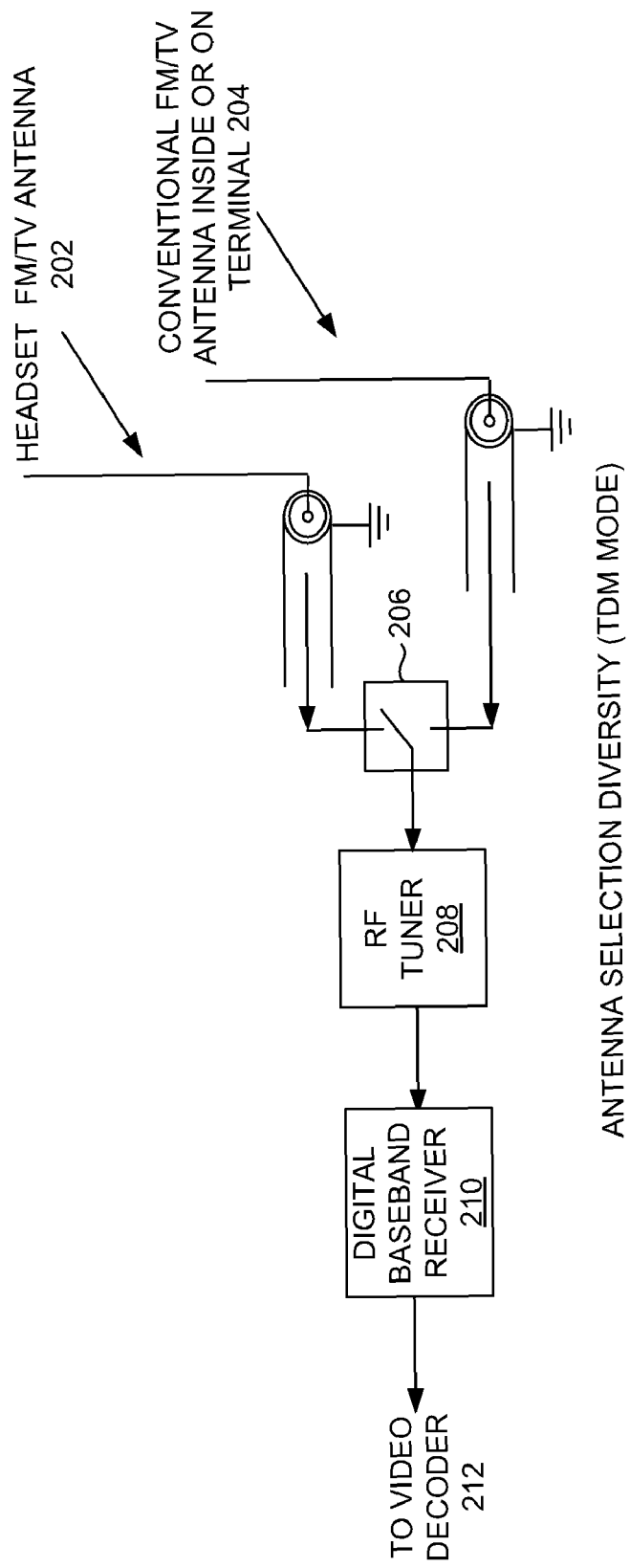
FIG. 2 illustrates a system view of antenna selection diversity in TDM mode.

FIG. 2 illustrates a system view of antenna selection diversity in the TDM mode, having a headset FM/TV Antenna 202, a FM/TV antenna inside or on terminal 204, a switch 206, a radio frequency (RF) tuner 208, a digital baseband receiver 210, and a video decoder 212 according to an embodiment herein. The most basic form of diversity uses antenna selection diversity in TDM mode. The receiver may select the antenna with a strongest signal. In the antenna selection diversity, the receiver does not know in advance that the signal condition at the alternate antenna is in fact better (or could be worse). Because of this, switching the antenna (at random) is just likely to produce a worse signal than a better one. Therefore, these systems usually wait until the primary antenna's signal is almost completely useless before switching.

Figure 3:
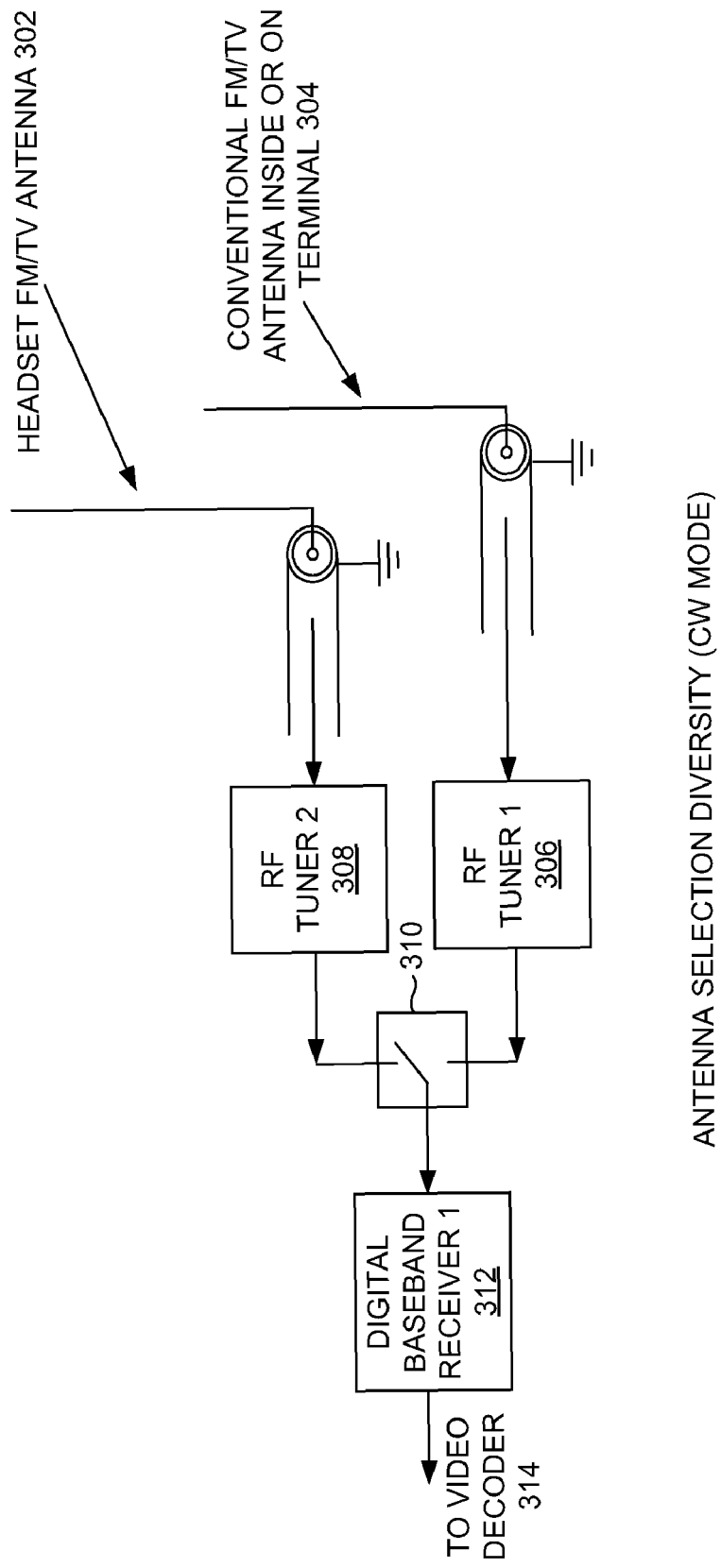
FIG. 3 illustrates a system view of antenna selection diversity in CW mode.

FIG. 3 illustrates a system view of antenna selection diversity in CW mode, having headset FM/TV antenna 302, a FM/TV antenna inside or on terminal 304, RF tuner 1 306, RF tuner 2 308, switch 310, digital baseband receiver 1 312, and video decoder 314 according to an embodiment herein. The switch 310 is positioned after the RF tuner 308. This method of diversity is an improvement on the previous one. The RF tuner 308 may be used to measure the signal strength at each antenna and report this information to the digital baseband receiver 1 312. This may allow the digital baseband receiver 1 312 to know in advance which antenna path has the stronger signal and improves performance by allowing the receiver to switch to a better antenna sooner.

Figure 4:
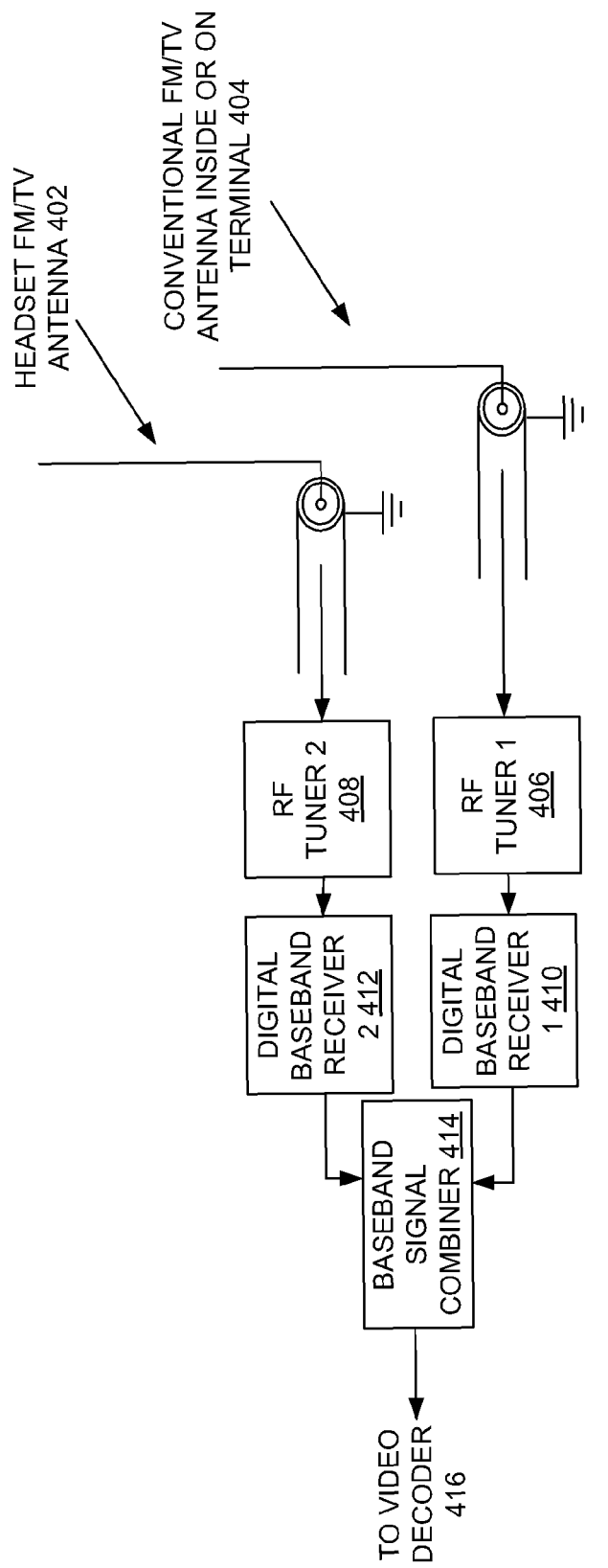
FIG. 4 illustrates a system view of signal combination diversity in Maximum Ration Combining (MRC) mode.

FIG. 4 illustrates a system view of signal combination diversity in MRC mode, having a headset FM/TV antenna 402, a FM/TV antenna inside or on terminal 404, an RF tuner 1 406, an RF tuner 2 408, a digital baseband receiver 1 410, a digital baseband receiver 2 412, a base band signal combiner 414, and a video decoder 416 according to an embodiment herein. The strongest form of diversity, MRC, improves receiver sensitivity from between 6 to 9 dB. The MRC improves receiver sensitivity even further by combining the two signals together (no switching needed). In this method, the signals from each channel are added together, the gain of each channel is made proportional to the root mean square (RMS) signal level and inversely proportional to the mean square noise level in that channel, and different proportionality constants are used for each channel. The implementation of diversity antennas in electronic devices may occupy larger space, hence making the size of the devices less portable.

Figure 5A:
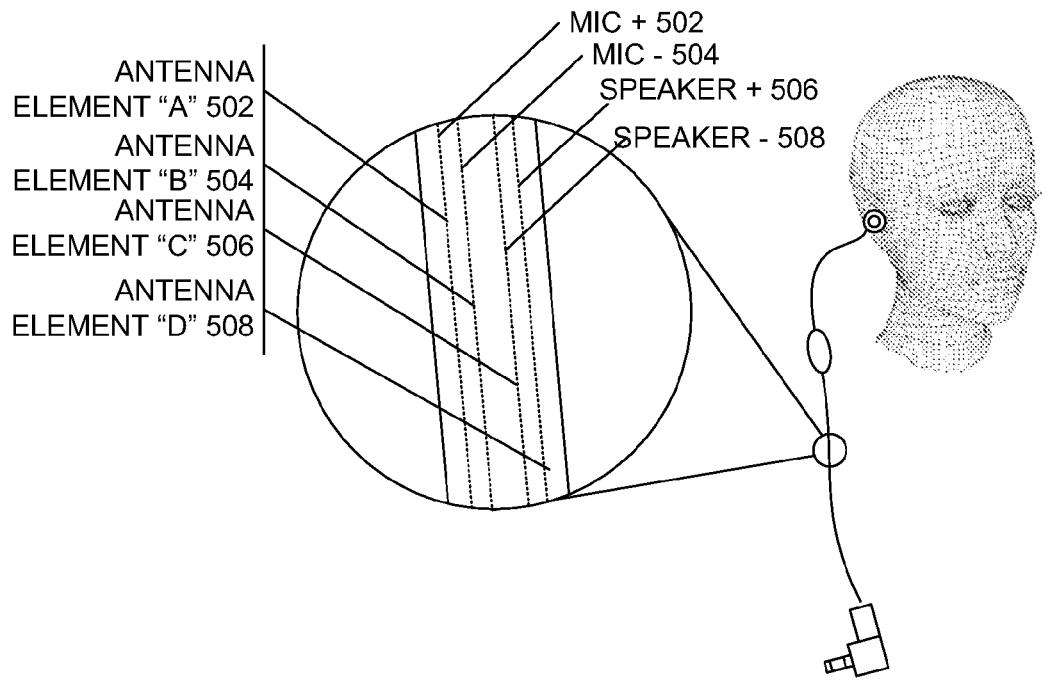
FIGS. 5A and 5B illustrate a cell-phone headset having an antenna element 'A', an antenna element 'B', an antenna element 'C', and an antenna element 'D'.
Figure 5B:
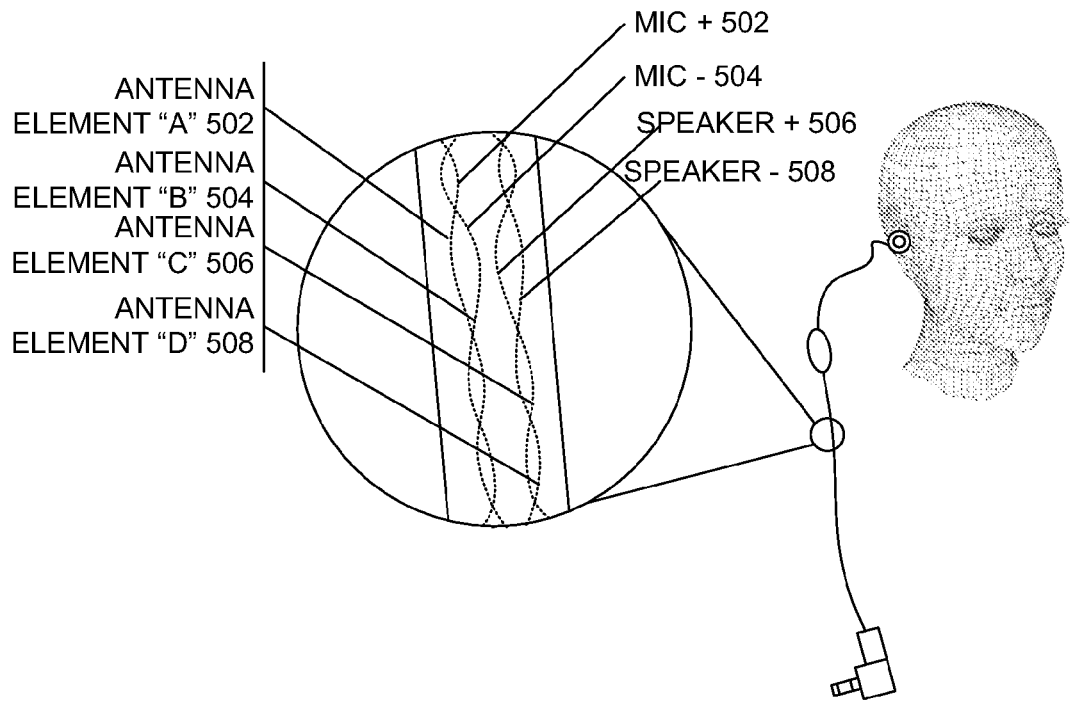

FIG. 5A and FIG. 5B illustrate the basic construction of a cell-phone headset having an antenna element 'A' 502, an antenna element 'B' 504, an antenna element 'C' 506, and an antenna element 'D' 508, according to an embodiment herein. The antenna elements 502-508 are used to carry speaker and microphone electronic signals. The four antenna elements 502-508 are used for diversity without compromising the headset's primary function. The antenna element 'A' 502 corresponds to microphone (+), the antenna element 'B' 504 corresponds to microphone (−), the antenna element 'C' 506 corresponds to speaker (+) and the antenna element 'D' 508 corresponds to speaker (−).

With reference to FIG. 5B, the wires (the antenna elements 502-508) inside the cell-phone headset are twisted to improve their immunity to interference. FIG. 6 illustrates the basic construction of a stereo headset in a mobile TV having an antenna element 'A' 602, an antenna element 'B' 604, an antenna element 'C' 606 an antenna element 'D' 608, an antenna element 'E' 610, and an antenna element 'F' 612, according to an embodiment herein. The antenna elements 602-612 are used to carry speaker and microphone electronic signals. The antenna elements 602-612 are for diversity without compromising the stereo headset's primary function.

Figure 7A:
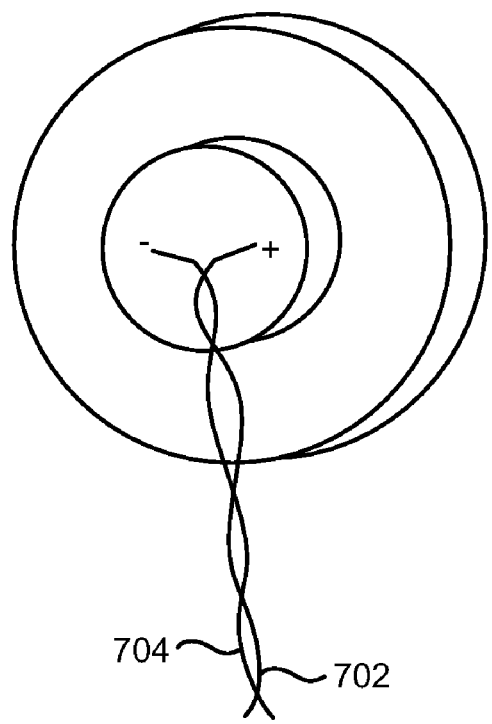
FIG. 7A illustrates the headset speaker having two wires.

The antenna element 'A' 602 corresponds to a microphone (+), the antenna element 'B' 604 corresponds to a microphone (−), the antenna element 'C' 606 corresponds to a left speaker (+), the antenna element 'D' 608 corresponds to a left speaker (−), the antenna element 'E' 610 corresponds to a right speaker (+), the antenna element 'F' 612 corresponds to a right speaker (−). The wires (e.g., the antenna elements 602-612) inside the stereo headset are twisted to improve their immunity to interference. FIG. 7A illustrates the headset speaker having two wires 702, 704, according to an embodiment herein. The wire 702 corresponds to the speaker (+) and the wire 704 corresponds to the speaker (−).

Figure 7B:
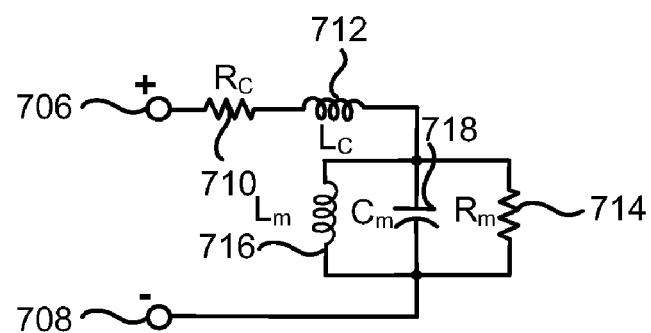
FIG. 7B illustrates an equivalent circuit for the headset speaker.
Figure 7C:
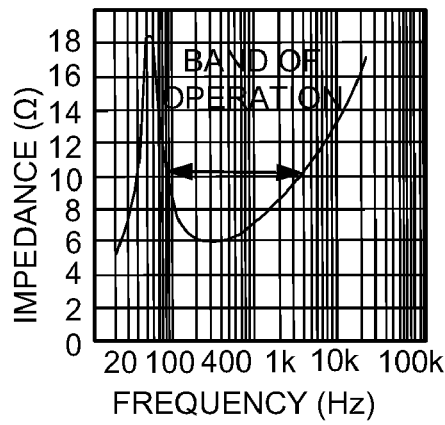
FIG. 7C illustrates a graphical representation of a headset speaker and an equivalent circuit frequency response.

FIGS. 7A and 7B illustrates an equivalent circuit for the headset speaker having a positive terminal 706, a negative terminal 708, a resistor Rc 710, an inductor Lc 712, a resistor Rm 714, an inductor Lm 716, and a capacitor Cm 718, according to an embodiment herein. With reference to FIGS. 7A through 7C illustrates a graphical representation of a headset speaker and an equivalent circuit frequency response, according to an embodiment herein. The graph is a plot of frequency (Hz) along x-axis and impedance ('Ω) along the y-axis. The plot shows two peak values when the impedance ('Ω) is above 16 and above 18.

Figure 7D:
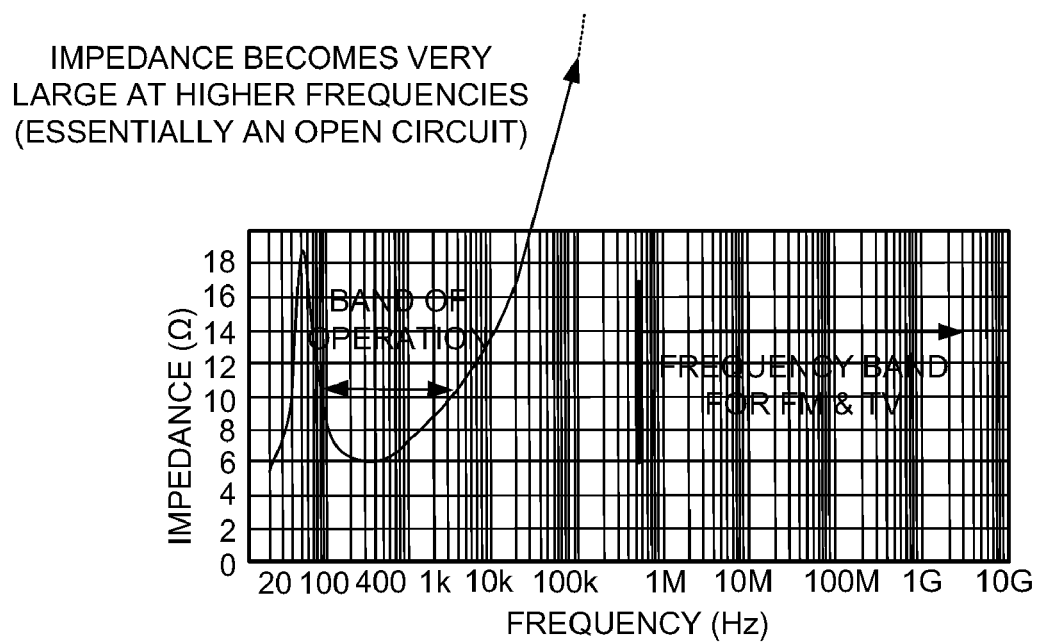
FIG. 7D illustrates a graphical representation of the headset speaker and the equivalent circuit showing a high impedance at frequencies used for mobile TV.

The band of operation lies in the frequency (Hz) range 100 Hz-5 KHz. FIG. 7D illustrates a graphical representation of the headset speaker and the equivalent circuit showing a high impedance at frequencies used for mobile TV (the antenna frequency), according to an embodiment herein. The graph of FIG. 7D is a plot of frequency (Hz) along x-axis and impedance ('Ω) along the y-axis. The plot shows a peak value of the impedance ('Ω) above 18 at frequency 20-100 Hz. The impedance ('Ω) decreases with further increase in frequency up to 400 Hz after which the impedance ('Ω) shows a steep increase with increase in frequency.

Figure 8A:
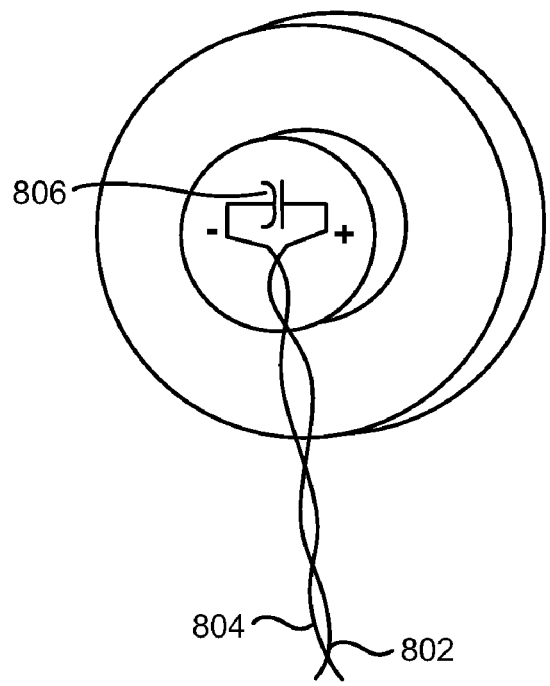
FIG. 8A illustrates a headset speaker with an ideal capacitor.
Figure 8B:
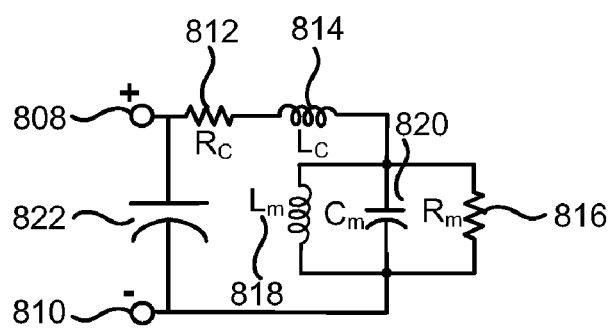
FIG. 8B illustrates an equivalent circuit for the headset speaker with an ideal capacitor.

The impedance reaches a peak value at higher frequencies (e.g., essentially an open circuit). The band of operation lies in the frequency (Hz) range 100 Hz-5 KHz. FIG. 8A illustrates the headset speaker with ideal capacitor termination having two wires 802, 804 and an ideal capacitor 806, according to an embodiment herein. The wire 802 corresponds to the speaker (+) and the wire 804 corresponds to the speaker (−). FIGS. 8A and 8B illustrates an equivalent circuit for the headset speaker with an ideal capacitor having a positive terminal 808, a negative terminal 810, a resistor Rc 812, an inductor Lc 814, a resistor Rm 816, an inductor Lm 818, a capacitor Cm 820, and an ideal capacitor 822, according to an embodiment herein.

Figure 8C:
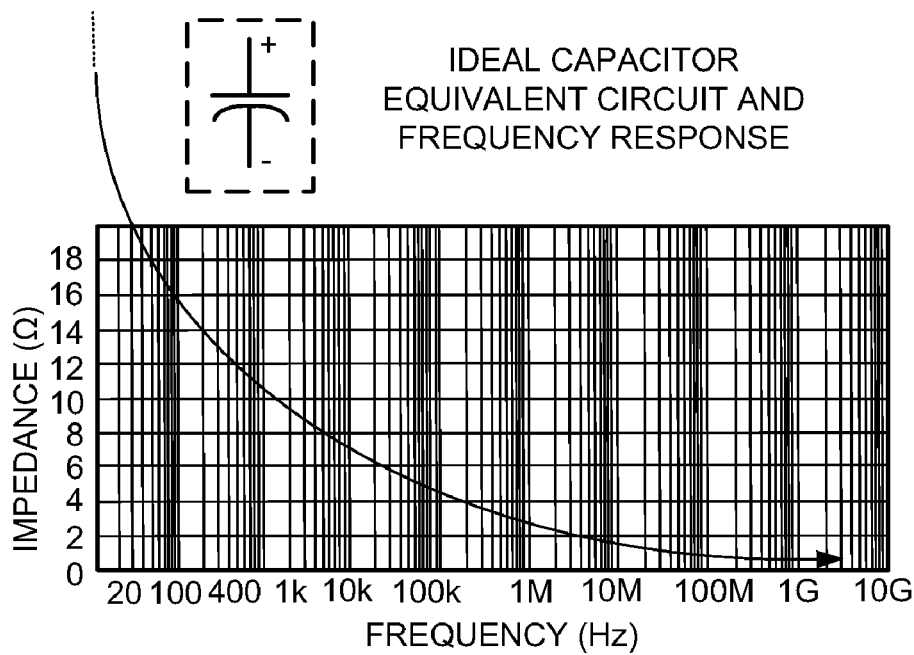
FIG. 8C illustrates a graphical representation of an ideal capacitor equivalent circuit and frequency response.
Figure 8D:
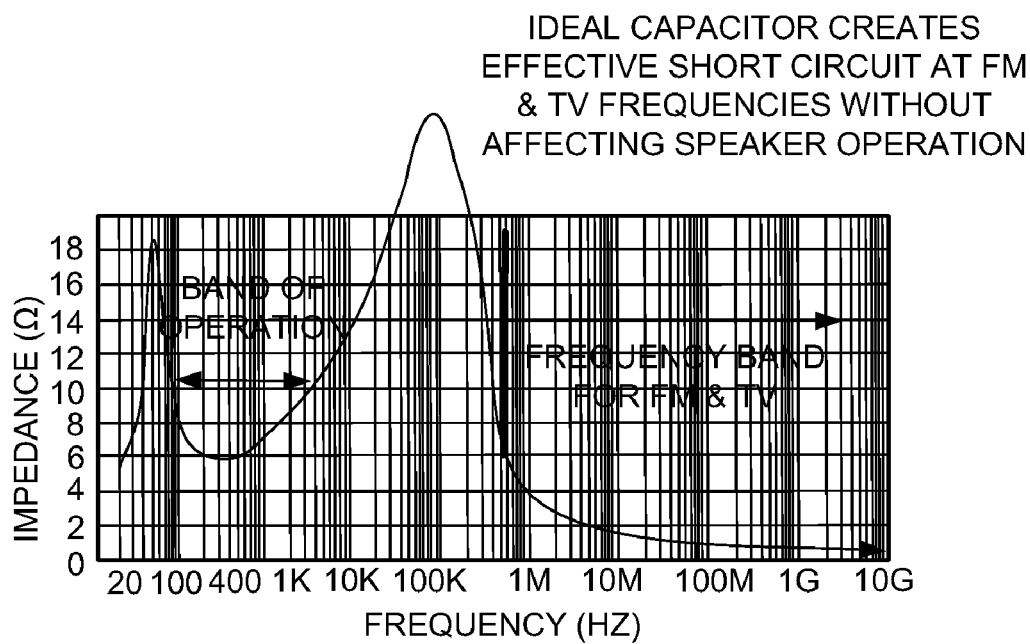
FIG. 8D illustrates a graphical representation of a headset speaker with an ideal capacitor frequency response at FM and TV frequencies.

In one embodiment, terminating the speaker with an ideal capacitor has the effect of short circuiting the speaker wires (e.g., at TV frequencies) essentially making the two wires appear like one. FIG. 8C illustrates a graphical representation of an ideal capacitor equivalent circuit and frequency response, according to an embodiment herein. The graph of FIG. 8C is a plot of frequency (Hz) along x-axis and impedance ('Ω) along the y-axis. The plot shows a decrease in the impedance ('Ω) values with increasing frequencies. FIG. 8D illustrates a graphical representation of the headset speaker with ideal capacitor frequency response at FM and TV frequencies, according to an embodiment herein.

The graph represents a plot of frequency (Hz) along x-axis and impedance ('Ω) along the y-axis. The plot shows a peak value of the impedance ('Ω) above 18 at frequency 20-100 Hz, the impedance ('Ω) decreases with further increase in frequency up to 400 Hz after which the impedance ('Ω) reaches a peak value (e.g., a steep increase) with increase in frequency. The impedance ('Ω) shows a strong peak at a frequency of 100 KHz, after which the impedance ('Ω) starts decreasing with increasing frequencies. The ideal capacitor creates an effective short circuit at FM and TV frequencies without affecting the speaker operation.

The ideal capacitor is connected in parallel with the speaker to effectively eliminate high impedance (at TV frequencies). FIG. 9A illustrates a λ/4 monopole antenna having single radiating elements, according to an embodiment herein. FIG. 9B is an exploded view of the headset speaker terminated with an ideal capacitor having the headset speaker with a capacitor termination 902, a circuit block 904, and the antenna elements 906, according to an embodiment herein. The antenna elements 906 correspond to speaker (+), speaker (−), microphone (+), and microphone (−). The circuit block 904 includes capacitors to create very low impedance at FM and TV frequencies (e.g., open circuit/high impedance at audio frequency). In one embodiment, ideal capacitors can be used at all portions of the headset circuits to create one effective wire. The speaker terminated with an ideal capacitor short circuits the speaker wires (e.g., at TV frequencies) essentially making the two wires appear like one.

Figure 10:
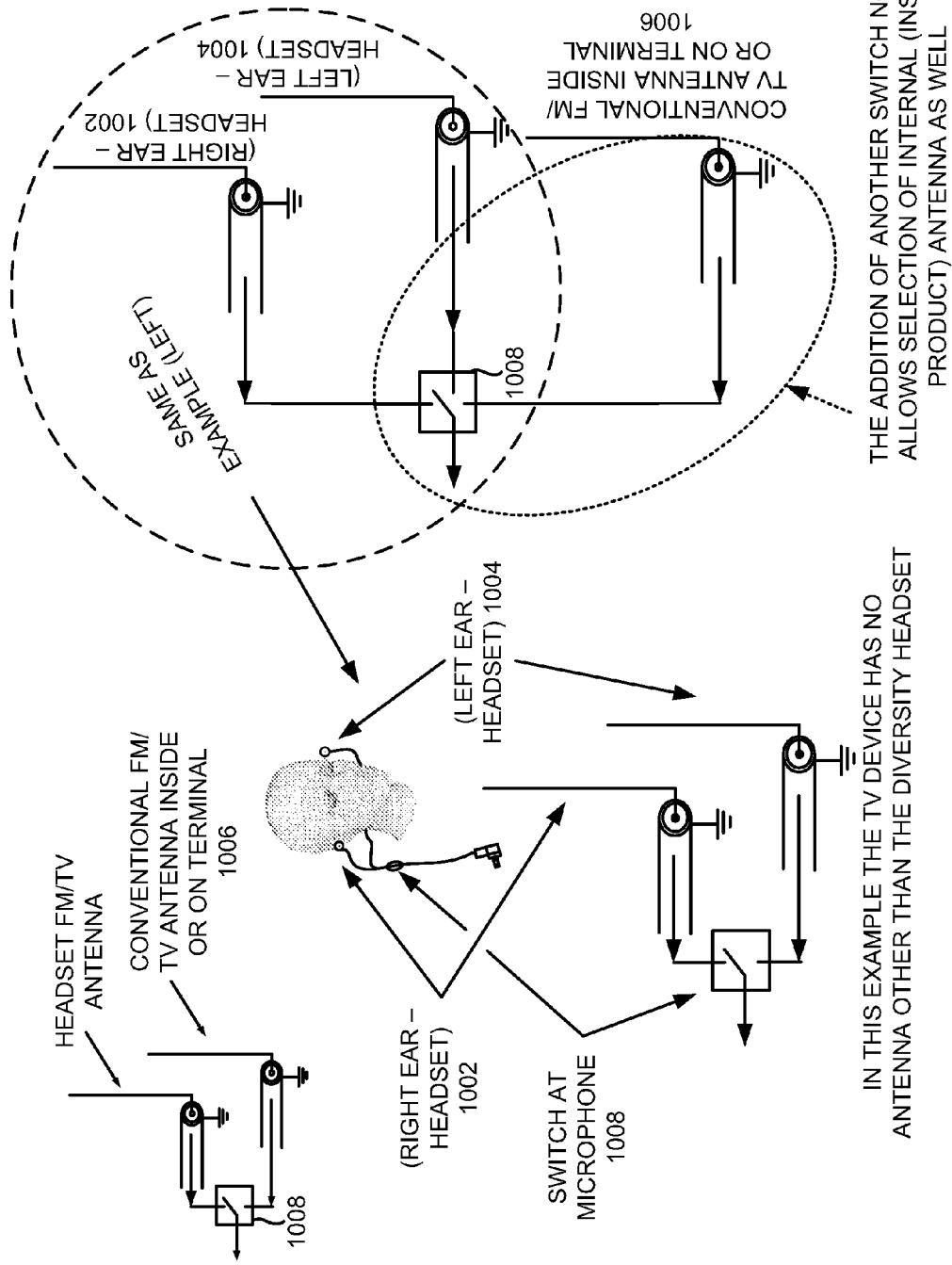
FIG. 10 illustrates a system view of an antenna receiver diversity system.

FIG. 10 illustrates a system view of a receiver 1000 with antenna selection diversity having headsets 1002 and 1004, a conventional FM/TV antenna inside or on terminal 1006, and a switch 1008, according to an embodiment herein. The headsets 1002 and 1004 correspond to FM/TV antenna connected to the nodes of the switch 1008. The switch 1008 may be configured as a switch and microphone in an embodiment. The FM/TV antenna inside or on terminal 1006 may be an additional internal antenna which is allowed by the addition of another switch node in the switch 1008.

FIG. 11 illustrates an exploded view of a mobile TV receiver 1100 having a memory 1102 with a computer set of instructions, a bus 1104, a speaker 1108, and a processor 1106 capable of processing the set of instructions to perform any one or more of the methodologies herein, according to an embodiment herein. The processor 1106 may also enable frequency samples to be consumed in the form of audio for output via speaker and/or earphones 1108.

The processor 1106 may also carry out the methods described herein and in accordance with the embodiments herein. The received frequency domain sample may also be stored in the memory 1102 for future processing or consumption. The memory 1102 may also store specific information about the frequency domain sample available in the future or stored from the past. When the sample is selected, the processor 1106 may pass information. The information may be passed among functions within mobile TV receiver 1100 using the bus 1104.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The invention addresses the implementation of the two diversity antennas in small portable media devices and/or cell phones. Due to the small feature size of the devices, two diversity antenna implementation options are proposed. One antenna is implemented in the portable media player or the handset and the other antenna is implemented in the headset. The two antennas are implemented perpendicular to one another, and can even be built into the geometric shape of the cell phone or portable media devices. The diversity antenna implemented in electronic devices occupies lesser space, hence making the size of the devices more portable and convenient.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A mobile telecommunications apparatus comprising:
    a portable media device that receives electronic data through a network, said portable media device comprising a first antenna that receives electromagnetic signals of a particular frequency, wherein said frequency is at least one of a radio frequency and a television (TV) frequency; and
    a headset in electrical communication with said portable media device, wherein said headset receives said electronic data through said network, wherein said headset comprises:
        a switch coupled to said first antenna;
        a second antenna coupled to said switch, wherein said second antenna is structurally separate from said first antenna; and
        a headset speaker comprising at least one of a mono headset speaker and a stereo headset speaker,
        wherein said switch combines operation of said first antenna and said second antenna into a dual operation diversity receiver.

2. The apparatus of claim 1, wherein said network comprises a Digital Video Broadcasting over Handheld (DVB-H) network.

3. The apparatus of claim 1, wherein said mono headset speaker of said headset comprises one headset speaker.

4. The apparatus of claim 1, wherein said mono headset speaker of said headset comprises a first antenna element corresponding to a microphone (+), a second antenna element corresponding to a microphone (−), a third antenna element corresponding to a speaker (+), and a fourth antenna element corresponding to a speaker (−).

5. The apparatus of claim 1, wherein said stereo headset speaker of said headset comprises a plurality of speakers.

6. The apparatus of claim 1, wherein said stereo headset speaker of said headset comprises a first antenna element corresponding to a microphone (+), a second antenna element corresponding to a microphone (−), a third antenna element corresponding to a left speaker (+), a fourth antenna element corresponding to a left speaker (−), a fifth antenna element corresponding to a right speaker (+), and a sixth antenna element corresponding to a right speaker (−).

7. The apparatus of claim 4, wherein said first antenna element and said second antenna element of said mono headset speaker and said stereo headset speaker of said headset are coupled to a capacitor to reduce a high impedance by creating an effective short circuit based on at least one of said radio frequency or said TV frequency without affecting an operation of said headset speaker.

8. The apparatus of claim 1, wherein said first antenna of said portable media device is perpendicular to said second antenna of said headset.

9. The apparatus of claim 1, wherein said first antenna of said portable media device is in a geometric shape of said portable media device.

10. An antenna diversity system comprising:
    a first antenna that transmits and receives electronic data through a network, said first antenna being positioned in a portable media device; and
    a second antenna that receives audio signals through said network, said second antenna being positioned in a headset operatively connected to said portable media device, wherein said headset comprises:

a headset speaker comprising a plurality of antenna elements, said plurality of antenna elements being combined by a capacitor; and a switch coupled to said first antenna and to said second antenna, wherein said switch combines operation of said first antenna and said second antenna into a dual operation diversity receiver.

11. The system of claim 10, wherein said headset speaker comprises at least one of a mono headset speaker and a stereo headset speaker.

12. The system of claim 11, wherein said mono headset speaker of said headset comprises one headset speaker.

13. The system of claim 11, wherein said stereo headset speaker of said headset comprises a plurality of speakers.

14. The system of claim 10, wherein said first antenna receives electromagnetic signals of a particular frequency, wherein said frequency comprises at least one of a radio frequency and a television (TV) frequency, and wherein said capacitor reduces a high impedance by creating an effective short circuit based on at least one of said radio frequency and said TV frequency without affecting an operation of said headset speaker.

15. The system of claim 10, wherein said first antenna of said portable media device is positioned perpendicular to said second antenna of said headset.

16. The system of claim 10, wherein said first antenna of said portable media device is in a geometric shape of said portable media device.

17. A system comprising:
a portable media device component;
a first antenna positioned in said portable media device component, wherein said first antenna transmits and receives electronic data through a network;
a headset operatively connected to said portable media device component;
a second antenna coupled to said headset, wherein said first antenna and said second antenna are not directly connected to each other; and
a switch that combines operation of said first antenna and said second antenna into a dual operation diversity receiver.

18. The system of claim 17, wherein said headset further comprising a plurality of antenna elements, said plurality of antenna elements being coupled to a capacitor to reduce a high impedance in said portable media devicec component by creating an effective short circuit based on at least one of a radio frequency and a television (TV) frequency without affecting an operation of said headset.

19. The system of claim 17, wherein said first antenna of said portable media device component is operationally perpendicular to said second antenna of said headset.

20. The system of claim 17, wherein said first antenna of said portable media device is in a geometric shape of said portable media device component.

* * * * *